(12) United States Patent
Kim

(10) Patent No.: US 9,350,195 B2
(45) Date of Patent: May 24, 2016

(54) WIRELESS POWER CHARGING DEVICE AND METHOD FOR MOBILE EQUIPMENT

(71) Applicant: BNR TECHNOLOGY CO., LTD., Incheon (KR)

(72) Inventor: Young-Hyun Kim, Anyang-si (KR)

(73) Assignee: BNR TECHNOLOGY CO., LTD. (KR)

( * ) Notice: Subject to any disclaimer, the term of this patent is extended or adjusted under 35 U.S.C. 154(b) by 150 days.

(21) Appl. No.: 14/225,906

(22) Filed: Mar. 26, 2014

(65) Prior Publication Data

US 2014/0203773 A1 Jul. 24, 2014

Related U.S. Application Data

(63) Continuation of application No. PCT/KR2011/009313, filed on Dec. 2, 2011.

(30) Foreign Application Priority Data

Oct. 11, 2011 (KR) ........................ 10-2011-0103766

(51) Int. Cl.
*H02J 7/00* (2006.01)
*H02J 7/02* (2016.01)
*H02J 17/00* (2006.01)

(52) U.S. Cl.
CPC *H02J 7/025* (2013.01); *H02J 17/00* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 6,977,480 B2* | 12/2005 | Emori | ................... | B60L 11/185 320/104 |
| 7,301,308 B2* | 11/2007 | Aker | ..................... | H02J 7/0042 320/139 |
| 2010/0127660 A1 | 5/2010 | Cook et al. | | |
| 2010/0225272 A1* | 9/2010 | Kirby | ....................... | H04B 5/00 320/108 |
| 2012/0274149 A1* | 11/2012 | Kanno | .................... | H02J 17/00 307/104 |

FOREIGN PATENT DOCUMENTS

| | | |
|---|---|---|
| JP | 08126230 | 5/1996 |
| JP | 2011072116 | 4/2011 |
| KR | 1020100088117 | 8/2010 |
| KR | 1020110044794 | 4/2011 |

OTHER PUBLICATIONS

International Search Report—PCT/KR2011/009313 dated Sep. 26, 2012.

\* cited by examiner

*Primary Examiner* — Yalkew Fantu
(74) *Attorney, Agent, or Firm* — Cantor Colburn LLP

(57) ABSTRACT

A wireless power charging device and method for mobile equipment is provided. The wireless power charging device for mobile equipment includes: a signal oscillating unit receiving power from a power supply unit and oscillating a signal; a power signal generating unit generating a power signal by resonating with a signal oscillated by the signal oscillating unit; and a charging unit storing the generated power signal and supplying power to the mobile equipment on the basis of the stored power signal.

4 Claims, 4 Drawing Sheets

WIRELESS POWER CHARGING DEVICE AND METHOD FOR MOBILE EQUIPMENT

TECHNICAL FIELD

The present invention relates to a wireless power charging device and method for mobile equipment, and more particularly, to a wireless power charging device and method for mobile equipment, whereby user's mobile equipment can be charged in a wireless manner without causing the user's mobile equipment to directly contact a power supply unit so that mobile equipment can be naturally used while it is charged.

BACKGROUND ART

As information communication technology has been rapidly developed, mobile equipment, such as a laptop computer, a mobile phone, or a smartphone, is used as not only simply a wireless communication means but also a means for processing, transmitting and storing various pieces of information. In mobile equipment that performs various functions in this way, charging of power is a very important technology factor.

In general, power and a power supply circuit used to perform a power charging method for mobile equipment vary according to specification of mobile equipment. Thus, after a dedicated adaptor is connected to mobile equipment, power received from a power supply unit through the dedicated adaptor is converted and transmitted to mobile equipment.

However, in the power charging method, mobile equipment should be put into contact with the adaptor so that mobile equipment can be charged. Thus, the usage of mobile equipment is not free while it is charged.

SUMMARY OF THE INVENTION

The present invention provides a wireless power charging device and method for mobile equipment, whereby mobile equipment can be freely used while it is charged.

According to an aspect of the present invention, there is provided a wireless power charging device including: a signal oscillating unit receiving power from a power supply unit and oscillating a signal; a power signal generating unit generating a power signal by resonating with a signal oscillated by the signal oscillating unit; and a charging unit storing the generated power signal and supplying power to the mobile equipment on the basis of the stored power signal.

The wireless power charging device may further include at least one relay unit disposed between the signal oscillating unit and the power signal generating unit and relaying a signal oscillated by the signal oscillating unit to the power signal generating unit.

The power signal generating unit may include: a resonating unit generating a signal to resonate with a signal oscillated by the signal oscillating unit; and a signal converting unit converting the signal generated by the resonating signal into the power signal.

The signal oscillating unit may include: a circular antenna coil set to a diameter having a predetermined length; and a capacitor connected to the antenna coil in series.

The relay unit may include a second antennal coil set to a length that is less than the diameter of the circular antenna coil.

The circular antenna coil and the second antenna coil may be installed to be parallel to each other.

According to another aspect of the present invention, there is provided a wireless power charging method including: receiving power from a power supply unit and oscillating a signal; generating a power signal by resonating with an oscillated signal; and storing the generated power signal and supplying power to the mobile equipment on the basis of the stored power signal.

The wireless power charging method may further include relaying a signal oscillated in the oscillating of the signal.

The generating of the power signal may include: generating a signal to resonate with the oscillated signal; and converting the generated, resonating signal into the power signal.

The oscillating of the signal may include oscillating power received from a power supply unit through a circular antenna coil set to a diameter having a predetermined length and a capacitor connected to the antenna coil in series.

The relaying of the signal may include relaying the oscillated signal through at least one, second antenna coil set to a length that is less than the diameter of the circular antenna coil.

The circular antenna coil and the second antenna coil may be installed to be parallel to each other.

DETAILED DESCRIPTION OF THE INVENTION

Hereinafter, the present invention will be described in detail by explaining exemplary embodiments of the invention with reference to the attached drawings.

Figure 1:
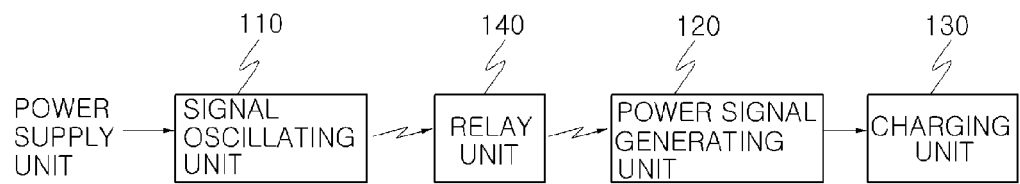
FIG. 1 schematically illustrates a configuration of a wireless power charging device for mobile equipment according to an embodiment of the present invention.

FIG. 1 schematically illustrates a configuration of a wireless power charging device for mobile equipment according to an embodiment of the present invention.

Referring to FIG. 1, the wireless power charging device for mobile equipment according to the current embodiment of the present invention may include a signal oscillating unit 110, a power signal generating unit 120, a charging unit 130, and at least one relay unit 140. Here, the power signal generating unit 120 and the charging unit 130 may be formed integrally with mobile equipment (not shown), and the signal oscillating unit 110 and the relay unit 140 may be installed to be spaced apart from each other by a predetermined distance.

The signal oscillating unit 110 receives power from a power supply unit and oscillates a signal. Here, oscillation is an energy conversion method, whereby a periodic electric vibration signal, such as a sinusoidal wave or pulse, is generated. For example, the signal oscillating unit 110 may convert direct current (DC) energy into alternating current (AC) energy using an amplification or control unit of a transistor and may also set a frequency of the sinusoidal wave using a coil and a capacitor.

Figure 2:
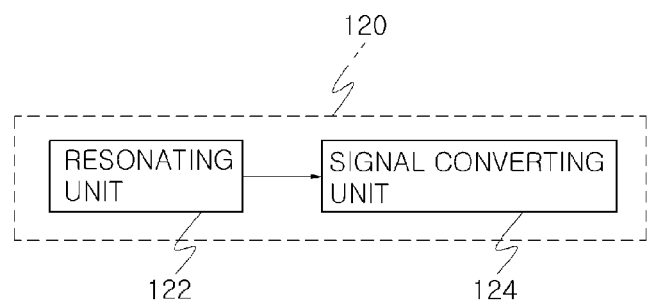
FIG. 2 schematically illustrates an example of a configuration of a power signal generating unit of the wireless power charging device illustrated in FIG. 1.

The power signal generating unit 120 generates a power signal by resonating with a signal oscillated by the signal oscillating unit 110. Here, the power signal generating unit 120 may include a resonating unit 122 that generates a signal to resonate with the signal oscillated by the signal oscillating unit 110 and a signal converting unit 124 that converts the signal generated by the resonating unit 122 into a power signal, as illustrated in FIG. 2.

Resonance is a phenomenon that vibration or signal of a certain frequency becomes strong through external vibration or signal. For example, when a swing or pendulum swings, it swings strongly with a very small force when force is applied to the swing or pendulum according to its swinging motion. In this way, a phenomenon that a vibration frequency applied from the outside coincides with an eigen vibration frequency of an object, is referred to as resonance, and the frequency is referred to as a resonant frequency. A wind instrument or a pipe organ uses vibration of air in a tube, and a string instrument or piano uses resonance of a string, and tuning (channel selection) of a radio uses resonance of electrical energy flowing through a coil and a capacitor.

The power signal generating unit 120 may generate a signal to resonate with the signal oscillated by the signal oscillating unit 110 and may convert the generated signal into a power signal. In this case, the power signal generating unit 120 may include a coil and a capacitor for resonating with the electrical energy oscillated by the signal oscillating unit 110 and may convert the signal generated by the power signal generating unit 120 into the power signal based on the electrical energy accumulated on the capacitor. To this end, the signal converting unit 124 may include an element, such as a rectifier or an analog-to-digital (AD) converter.

The charging unit 130 may store the power signal generated by the power signal generating unit 120 and may supply power to mobile equipment based on the stored power signal.

The relay unit 140 may be disposed between the signal oscillating unit 110 and the power signal generating unit 120 and may perform a function of relaying the signal oscillated by the signal oscillating unit 110 to the power signal generating unit 120.

Figure 3:
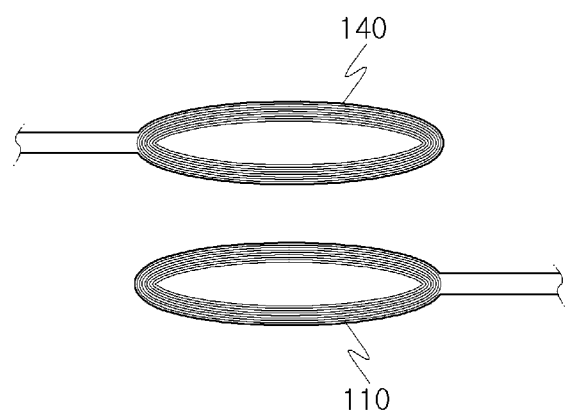
FIG. 3 illustrates an embodiment of a signal oscillating unit and a relay unit of the wireless power charging device of FIG. 1.

Here, the signal oscillating unit 110 and the relay unit 140 may be implemented as a coil having a closed loop shape, as illustrated in FIG. 3. The signal oscillating unit 110 may be implemented as a circular antenna coil that is set to a diameter having a predetermined length, and the relay unit 140 may be implemented as a second antenna coil set to a length that is less than the diameter of the signal oscillating unit 110. Also, the signal oscillating unit 110 and the relay unit 140 may be installed to be parallel to each other so that resonance of the signal can be facilitated. In this case, the power signal generating unit 120 may include a circular coil having a length that is less than a diameter of the relay unit 140.

In FIG. 3, the signal oscillating unit 110 and the relay unit 140 are implemented as the closed loop coil for resonance of the electrical energy. However, the configuration of the signal oscillating unit 110 and the relay unit 140 is not limited to the shape of the drawing. For example, the signal oscillating unit 110 may generate an AC signal having a constant frequency with respect to the electrical energy to be input from the power supply, and the relay unit 140 may be implemented as an element that receives the AC signal generated by the signal oscillating unit 110 in a wireless manner and transmits the received AC signal to the power signal generating unit 120 in a wireless manner. In this case, the power signal generating unit 120 may be implemented as an element that causes electrical resonance with a frequency of the AC signal generated by the signal oscillating unit 110.

Figure 4:
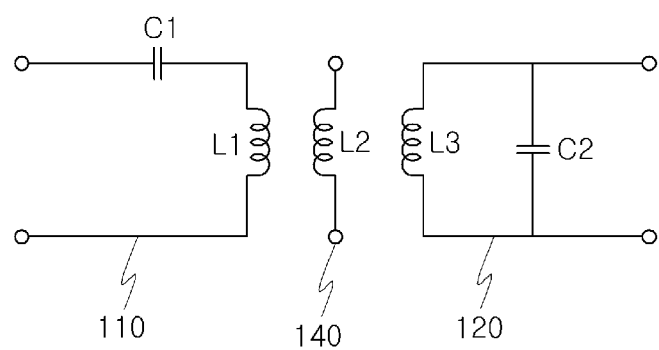
FIG. 4 illustrates an example of a circuit configuration of the wireless power charging device of FIG. 1.

FIG. 4 illustrates an example of a circuit configuration of the wireless power charging device of FIG. 1.

Referring to FIG. 4, the signal oscillating unit 110 may have a configuration in which a capacitor C1 is connected to a circular antenna coil L1 in series, and the relay unit 140 may be configured of a circular coil L2, and the power signal generating unit 120 may have a configuration in which a capacitor C2 is connected to a circular antenna coil L3 in parallel.

When AC power is applied to the signal oscillating unit 110 of the circuit, resonance occurs due to the antenna coil L1 and the capacitor C1, and a signal having a predetermined frequency is oscillated. In this case, a resonant frequency of the oscillated signal may vary according to capacitance of an inductance capacitor C1 of the antenna coil L1. A resonance phenomenon caused by the antenna coil and the capacitor is well-known technology and thus a detailed description thereof will be omitted.

On the other hand, when AC power is applied to the signal oscillating unit 110, reciprocal inductance occurs in the second antenna coil L3 of the power signal generating unit 120 that is installed to be parallel to a position in which the power signal generating unit 120 is adjacent to the signal oscillating unit 110. Resonance occurs due to the capacitor C2 that is connected to the second antenna coil L3 in parallel, and a power signal is generated. In this case, a resonant frequency of the power signal generated by the power signal generating unit 120 may be adjusted by inductance of the second antennal coil L3 and capacitance of the capacitor C2. In this case, the resonant frequency of the power signal generated by the power signal generating unit 120 may be set to be the same as the resonant frequency of the signal oscillated by the signal oscillating unit 110.

Figure 5:
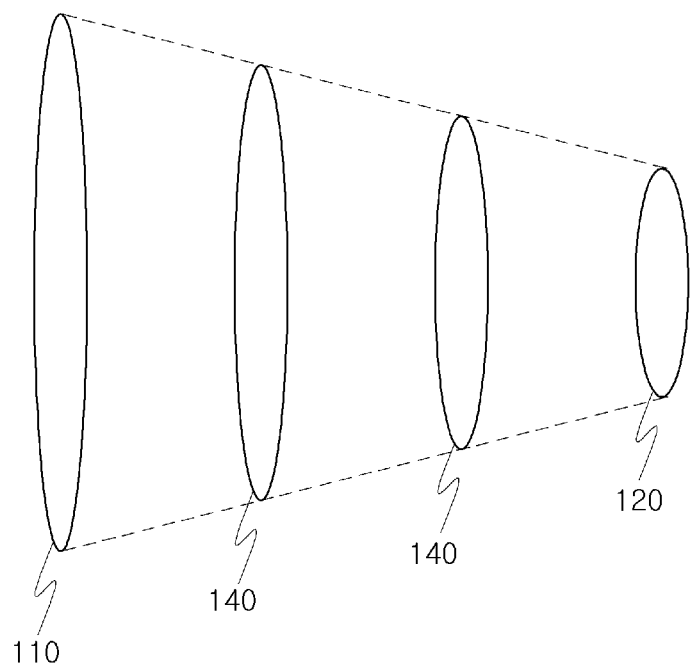
FIG. 5 illustrates an embodiment in which a plurality of relay units are installed.

The relay unit 140 may be provided between the signal oscillating unit 110 and the power signal generating unit 120 so that resonance of the signal oscillating unit 110 and the power signal generating unit 120 occurs smoothly. In this case, the relay unit 140 may be configured of a circular antenna coil L2, as illustrated in FIG. 4, and a plurality of relay units 140 may be implemented based on a distance between the signal oscillating unit 110 and the power signal generating unit 120. If a plurality of relay units 140 are provided, in order to minimize a reduction in reciprocal inductances, each circular antennal coil from the signal oscillating unit 110 to the power signal generating unit 120 may be implemented to have the same axis and a diameter that is gradually reduced, as illustrated in FIG. 5. In this case, a diameter of each antenna coil may vary according to intensity of a signal to be oscillated, a signal to be generated, a distance between the signal oscillating unit 110 and the relay unit 140, and a distance between the relay unit 140 and the power signal generating unit 120.

Also, the circular antenna coil of the power signal generating unit 120 can generate a power signal only when the circular antenna coil of the power signal generating unit 120 exists in the circular antennal coil of the relay unit 140 even though the circular antenna coil of the power signal generating unit 120 does not have the same axis as that of the relay unit 140. Thus, mobile equipment can be charged while freely moving in the range of the diameter of the circular antenna coil of the relay unit 140. In this case, the size of reciprocal inductances according to a position in the range of the circular antenna coil of the relay unit 140 will not be discussed.

Also, the diameter of the circular antenna coil of the power signal generating unit 120 may be implemented as a small, circular antenna coil having a diameter that is less than ½ of that of the circular antennal coil of the relay unit 140. In this case, a plurality of power signal generating units 120 may be included in the range of the relay unit 140. Thus, a plurality of mobile equipment can be simultaneously charged in the range of the diameter of the relay unit 140.

Figure 6:
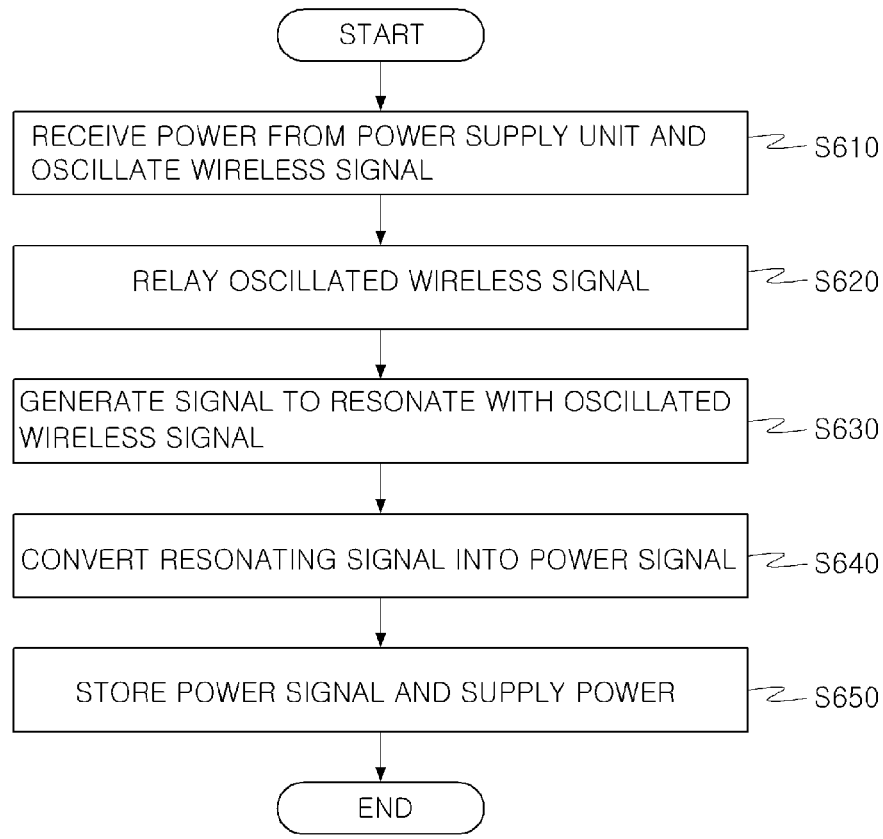
FIG. 6 is a flowchart illustrating a wireless power charging method for mobile equipment, according to an embodiment of the present invention.

FIG. 6 is a flowchart illustrating a wireless power charging method for mobile equipment, according to an embodiment of the present invention.

Referring to FIGS. 1 and 6, the signal oscillating unit 110 receives power from a power supply unit and oscillates a signal (S610).

When the signal oscillating unit 110 and the power signal generating unit 120 are spaced apart from each other by a predetermined distance, the relay unit 140 may be disposed between the signal oscillating unit 110 and the power signal generating unit 120 and may relay the signal oscillated by the signal oscillating unit 110 to the power signal generating unit 120 (S620).

The power signal generating unit 120 generates a signal to resonate with the same frequency as that of the signal oscillated by the signal oscillating unit 110 (S630). The above-described method may be used as the principle of a resonating signal caused by the power signal generating unit 120. In this case, the resonating signal generated by the power signal generating unit 120 is converted into a power signal through the signal converting unit 124 (S640).

The charging unit 130 stores the power signal generated by the power signal generating unit 120 and supplies power to mobile equipment based on the stored signal (S650).

Thus, in a wireless power charging device and method for mobile equipment according to the one or more embodiments of the present invention, mobile equipment can receive power in a wireless manner and can be charged without causing user's mobile equipment to directly contact a power supply unit or a dedicated adaptor. In addition, since power is received in the wireless manner, mobile equipment can be naturally used while it is charged, and the user's convenience can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

In a wireless power charging device and method for mobile equipment according to the present invention, user's mobile equipment can be charged in a wireless manner without causing the user's mobile equipment to directly contact a power supply unit or a dedicated adaptor. In addition, mobile equipment can be naturally used while it is charged.

The invention claimed is:

1. A wireless power charging device comprising:
a signal oscillating unit receiving power from a power supply unit and oscillating a signal;
a power signal generating unit generating a power signal by resonating with the signal oscillated by the signal oscillating unit;
a charging unit storing the generated power signal and supplying power to a mobile equipment on the basis of the stored power signal; and
at least one relay unit disposed between the signal oscillating unit and the power signal generating unit and relaying the signal oscillated by the signal oscillating unit to the power signal generating unit,
wherein the signal oscillating unit comprises a circular first antenna coil set to a first diameter having a predetermined length, and a first capacitor connected to the circular first antenna coil in series, wherein the at least one relay unit comprises a circular second antenna coil set to a second diameter having a predetermined length, and wherein the power signal generating unit comprises a circular third antenna coil set to a third diameter having a predetermined length, and a second capacitor connected to the circular third antenna coil in parallel, and
wherein the first diameter, the second diameter and the third diameter are gradually reduced in the described order.

2. The wireless power charging device of claim 1, wherein the circular first antenna coil, the circular second antenna coil and the circular third antenna coil are installed to be parallel to one another.

3. A wireless power charging method comprising:
receiving power from a power supply unit and oscillating a signal;
relaying the signal oscillated in the oscillating of the signal;
generating a power signal by resonating with the relayed signal; and
storing the generated power signal and supplying power to a mobile equipment on the basis of the stored power signal,
wherein the oscillating comprises oscillating the power through a circular first antenna coil set to a first diameter having a predetermined length and a first capacitor connected to the circular first antenna coil in series, wherein the relaying comprises relaying the signal through a circular second antenna coil set to a second diameter having a predetermined length, and wherein the generating comprises resonating with the relayed signal through a circular third antenna coil set to a third diameter having a predetermined length and a second capacitor connected to the circular third antenna coil in parallel, and
wherein the circular second antenna coil is disposed between the circular first antenna coil and the circular third antenna coil, and the first diameter, the second diameter and the third diameter are gradually reduced in the described order.

4. The wireless power charging method of claim 3, wherein the circular first antenna coil, the circular second antenna coil and the circular third antenna coil are installed to be parallel to each other one another.

* * * * *